United States Patent [19]

Flux et al.

[11] Patent Number: 4,805,850

[45] Date of Patent: Feb. 21, 1989

[54] HELICOPTER ROTOR CONTROL SYSTEMS

[75] Inventors: Peter J. Flux; Christopher S. Hughes, both of Yeovil, England

[73] Assignee: Westland Group plc, Yeovil, England

[21] Appl. No.: 59,756

[22] Filed: Jun. 8, 1987

[30] Foreign Application Priority Data

Jun. 20, 1986 [GB] United Kingdom ............... 8615109

[51] Int. Cl.⁴ .......................................... B64C 27/54
[52] U.S. Cl. ............................... 244/17.25; 416/163
[58] Field of Search ............. 416/163, 164, 154, 155, 416/156; 244/17.25

[56] References Cited

U.S. PATENT DOCUMENTS 1,052,378  2/1913  Porter ............................ 244/17.25
2,664,168 12/1953  Giroz ................................ 416/163

FOREIGN PATENT DOCUMENTS 536904  5/1941  United Kingdom ............... 416/163

*Primary Examiner*—Galen Barefoot
*Assistant Examiner*—Rodney Corl
*Attorney, Agent, or Firm*—Larson and Taylor

[57] ABSTRACT

A helicopter rotor control system includes a plurality of control rods (31) extending downwardly from pitch control means (24) through a hollow rotor drive shaft (12) and gearbox (14) for connection directly to individual actuators (36) located generally concentrically of an axis of rotation (15).

5 Claims, 1 Drawing Sheet

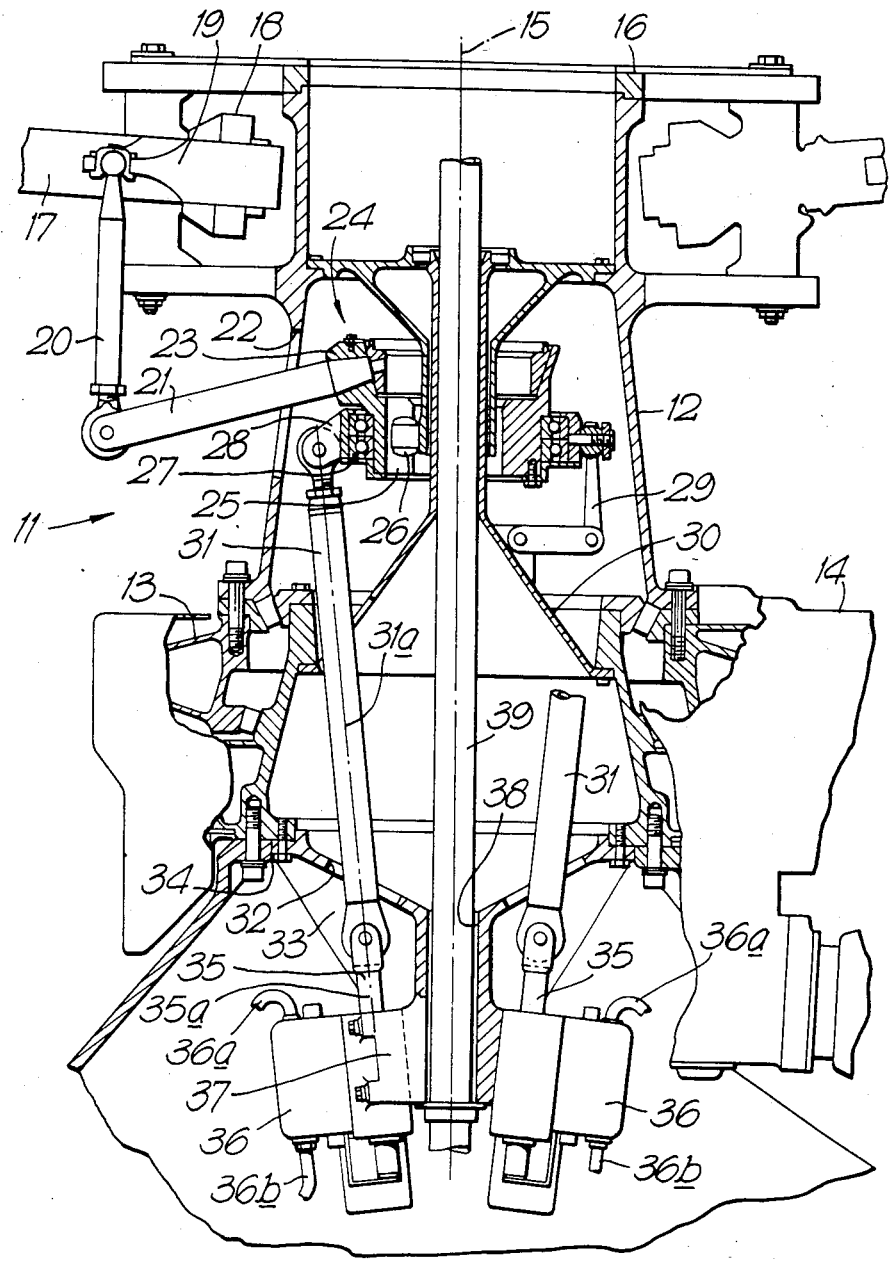

HELICOPTER ROTOR CONTROL SYSTEMS

This invention relates to helicopter rotor control systems and is particularly concerned with such systems for helicopter main sustaining rotors.

Helicopter rotors are known in which pitch control of each of a plurality of rotor blades is achieved by control means located within a hollow rotor drive shaft. Such an arrangement helps to protect the control means, that translate non-rotating control inputs to rotating control outputs, from the ingress of dirt and moisture and from damage.

Usually, a plurality of control rods extend downwardly from the control means through a hollow gearbox for attachment through pivoted joints and bell crank levers to a plurality of generally horizontal control rods which in turn are connected to the operating jacks. At least three such jacks are normally required for control purposes, so that the resulting control runs are complex and costly and can cause problems due to wear in the high number of pivoted mechanical joints.

An early example of such a control system was used on the Westland Scout helicopter introduced in 1959 and a more modern example is the system used on the Westland Lynx helicopter.

Accordingly, this invention provides a helicopter rotor control system for a rotor having a hollow rotor drive shaft attached to a hollow gearbox output for rotating a rotor head about an axis of rotation, and pitch control means internally of the drive shaft for converting non-rotating control inputs to rotating control outputs for changing the pitch of a plurality of rotor blades attached to the rotor head, said control means including a plurality of control rods extending downwardly through the hollow rotor drive shaft and said gearbox wherein the control rods are connected directly to individual actuators located generally symmetrically of the axis of rotation.

Conveniently, the actuators are secured to a mounting plate releasably attached beneath the gearbox and in a preferred embodiment the mounting plate is an annular plate located concentrically of the axis of rotation so as to permit installation of services along said axis.

The longitudinal axes of the control rods and of the operating rams of the associated actuators may be substantially aligned.

The actuators may be electro-hydraulic actuators.

The invention will now be described by way of example only and with reference to the accompanying drawing which comprises a fragmentary sectioned side elevation of a helicopter rotor control system according to this invention.

A helicopter main sustaining rotor 11 includes a hollow rotor drive shaft 12 attached to a hollow output gear 13 of a reduction gearbox 14. There are provided bearings 13a interposed between the stationary structure and the rotating gear 13 for rotation of the gear 13 about a generally vertical axis 15. The upper end of the drive shaft supports a rotor head 16 which in turn supports a plurality of generally radially extending rotor baldes 17.

Each of the rotor blades 17 is attached to rotor head 16 through a part spherical elastomeric bearing 18 which permits pitch change movements of the associated rotor blade 17 as well as operational flap and lag movements. Pitch change movements are effected through a pitch change horn 19 attached to each rotor blade and connected to the upper end of a generally vertical track rod 20 the lower end of which is connected to the outer end of a generally radially extending pitch arm 21 which extends through an aperture 22 in the drive shaft 12 and is connected to the rotating part 23 of a pitch control means generally indicated at 24 and located within the drive shaft 12.

In the illustrated embodiment the pitch control means 24 is similar to the mechanism disclosed in EP-A No. 0075407. The rotating part 23 includes a plurality of tracks 25 in each of which is located a spherical bearing 26 anchored to the rotor head 16. A ball bearing 27 external of the rotating part 23 carries a stationary ring 28 which is anchored by a scissors mechanism 29 to stationary support means 30.

The upper ends of six pitch control rods 31 (two only being shown) are pivotally attached to the stationary ring 28 and, in operation, relative vertical movements of the pitch control rods 31 cause vertical and tilting movements of the rotating part 23 which in turn acts through pitch arms 21, track rods 20 and pitch horns 19 to change the pitch of the blades 17 both collectively and cyclically.

The six pitch control rods 31 extend downwardly through the rotor drive shaft 12, the output ring gear 13 and the gearbox 14 and protrude through apertures 32 in an annular mounting plate 33 that is releasably attached through a radially outer flange 34 to the gearbox housing so as to be concentric with axis 15. The lower ends of the pitch control rods 31 are pivotally attached to the ends of the operating rams 35 of electro-hydraulic actuators 36 bolted to an external flange 37 at the lower end of the mounting plate 33 so as to be symmetrically arranged about the rotation axis 15.

Electric and hydraulic supplies 36a and 36b are connected to each actuator 36.

In the illustrated embodiment the actuators 36 are mounted so that in the mid-collective position shown the longitudinal axes 31a of the pitch control rods 31 and the longitudinal axes 35a of operating rams 35 of the associated actuators 36 are aligned, thereby ensuring that deviations from longitudinal alignment due to control movements of the control means 24 are minimised. The central aperture 38 in mounting plate 33 is concentric with the axis 15 to permit services such as electric and hydraulic supplies 39 to be routed to rotor head 15.

The location of the electro-hydraulic actuators 36 symmetrically about the axis of rotation 15 of the rotor head 16 directly beneath the pitch control means 24 and outside of the gearbox 14 minimises the length and complexity of the mechanical control runs compared to prior systems to provide a simpler installation with improved control system stiffness. The actuators 36 are protected from the ingress of dirt and moisture and from damage yet they are readily accessible for inspection, servicing and replacement. The in-line arrangement of the control rods 31 and operating rams 35 minimises side loads on the rams 35 during operation thereby minimising any wear on seals etc. in the electro-hydraulic actuators 36.

It will be understood that the provision of six actuators 36 in the illustrated embodiment provides cover for a failure in any of the three essential control circuits to enable control to be maintained in the event of a failure in any or all of the main control circuits.

Whilst one embodiment of the invention has been described and illustrated it will be apparent that many modifications may be made without departing from the scope of the invention as defined in the appended claims. For example, other types of pitch control means 24 such as a conventional swash plate could be used and any desired arrangement such as mechanical bearings or flexure members could be used to provide for blade pitch change movements in place of the elastomeric bearings 18. The in-line arrangement of the control rods 31 and operating rams 35 may mean that in some installations the lower pivotal attachments can be replaced by a simpler rigid, e.g. bolted, attachment, perhaps by a central bolt extending through the length of the ram 35 for access at the opposite end of the actuator, to provide a generally rigid attachment of the rods to the rams, small transverse operational movements at the upper end of the rods being accommodated by flexing of the control rods 31. Such an arrangement may also reduce the length of the assembly below the mounting plate 33 since it would no longer be necessary to provide access to the lower pivotal attachments.

What is claimed is:

1. A helicopter rotor control system for a rotor having a hollow rotor drive shaft attched to a hollow gearbox output for rotating a rotor head about an axis of rotation and pitch control means internally of the drive shaft for converting non-rotating control inputs to rotating control outputs for changing the pitch of a plurality of rotor blades attached to the rotor head, wherein a plurality of control rods extend downwardly through the hollow rotor drive shaft and the gearbox and are connected directly to individual actuators located generally symmetrically about the axis of rotation.

2. A control system as claimed in claim 1, wherein the actuators are secured to a mounting plate releasably attached beneath the gearbox.

3. A control system as claimed in claim 2, wherein said mounting plate is an annular plate.

4. A control system as claimed in claim 1, wherein the longitudinal axes of the control rods and of the operating rams of the associated actuators are substantially aligned.

5. A control system as claimed in claim 1, wherein the actuators are electro-hydraulic actuators.

* * * * *